(12) United States Patent
Horn et al.

(10) Patent No.: US 10,378,982 B2
(45) Date of Patent: *Aug. 13, 2019

(54) DEVICE AND METHOD FOR MEASURING THE TENSION IN A TENSIONING BELT

(71) Applicant: SPANSET INTER AG, Wollerau (CH)

(72) Inventors: Peter Horn, Mels (CH); Heinz Siegrist, Fitzbach (CH); Andre Mamie, Wadenswil (CH)

(73) Assignee: SPANSET INTER AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/535,174

(22) PCT Filed: Dec. 11, 2015

(86) PCT No.: PCT/CH2015/000182
§ 371 (c)(1),
(2) Date: Jun. 12, 2017

(87) PCT Pub. No.: WO2016/090504
PCT Pub. Date: Jun. 16, 2016

(65) Prior Publication Data
US 2017/0322097 A1    Nov. 9, 2017

(30) Foreign Application Priority Data

Dec. 11, 2014 (CH) .................................. 1914/14

(51) Int. Cl.
*G01L 5/10* (2006.01)
*B60P 7/08* (2006.01)

(52) U.S. Cl.
CPC .............. *G01L 5/10* (2013.01); *B60P 7/0861* (2013.01)

(58) Field of Classification Search
CPC ......... B60P 7/0861; D07B 1/145; G01L 5/10; G01L 5/045; G01L 5/103; G01L 5/06; B60R 2021/01272; B60R 2021/01317
See application file for complete search history.

(56) References Cited

U.S. PATENT DOCUMENTS 3,342,067 A * 9/1967 Bush .................... G01L 5/06
                                                    73/158
3,388,593 A * 6/1968 Glerum ................ G01L 5/06
                                                    24/134 R
(Continued)

FOREIGN PATENT DOCUMENTS

DE         19739667       3/1999
EP         0984873        3/2000
(Continued)

*Primary Examiner* — Harshad R Patel
*Assistant Examiner* — Tran M. Tran
(74) *Attorney, Agent, or Firm* — Morriss O'Bryant Compagni Cannon, PLLC

(57) ABSTRACT

A device for measuring the tension in a tensioning belt comprises a retaining device for retaining a spring element, an elastically deformable spring element that is retained by the retaining device and on which a section of the tensioning belt can apply a force and elastically deform the spring element, the ends of the spring element being moved closer to one another when the tensioning force increases, and an electronic sensor unit. The sensor unit comprises a sensor system that measures the deflection of the spring element and generates a data signal, and a transmitter for transmitting the data signal to a receiving unit. The sensor system is situated at the ends of the spring element.

16 Claims, 3 Drawing Sheets

(56) References Cited

U.S. PATENT DOCUMENTS

| | | | | |
|---|---|---|---|---|
| 3,943,761 | A * | 3/1976 | Shoberg | G01L 5/102 73/862.474 |
| 4,171,639 | A * | 10/1979 | Simon | G01G 3/1402 73/862.541 |
| 4,213,334 | A * | 7/1980 | Wikoff | G01L 5/06 73/862.471 |
| 4,761,569 | A * | 8/1988 | Higgs | H03K 17/9517 307/116 |
| 4,989,450 | A * | 2/1991 | Shoberg | G01L 5/10 73/1.15 |
| 5,012,680 | A * | 5/1991 | Castagnoli | G01G 19/18 73/862.393 |
| 5,016,026 | A * | 5/1991 | Flory | B63B 21/00 177/147 |
| 5,449,151 | A * | 9/1995 | Johnson | B60P 7/0861 114/215 |
| 5,694,337 | A * | 12/1997 | Macken | B63B 49/00 242/904 |
| 6,237,413 | B1 * | 5/2001 | Dolezych | G01L 5/06 73/379.03 |
| 6,357,978 | B1 * | 3/2002 | Kamper | B60P 7/0823 410/100 |
| 6,454,304 | B1 * | 9/2002 | Steffens, Jr. | B60R 22/48 177/144 |
| 6,522,131 | B1 * | 2/2003 | Hiligsmann | G01D 3/02 324/174 |
| 6,679,524 | B2 * | 1/2004 | Greib | B60R 22/48 180/268 |
| 6,722,212 | B2 * | 4/2004 | Specht | G01L 5/10 24/633 |
| 6,729,194 | B2 * | 5/2004 | Kaijala | B60R 22/18 73/811 |
| 6,993,436 | B2 * | 1/2006 | Specht | B60R 22/48 701/45 |
| 6,997,478 | B2 * | 2/2006 | Hlavaty | B60R 21/0155 280/801.1 |
| 7,000,488 | B2 * | 2/2006 | Ante | B60R 22/18 73/862 |
| 7,007,976 | B2 * | 3/2006 | Ante | B60R 22/48 180/268 |
| 7,100,944 | B2 * | 9/2006 | Stanley | B60R 22/18 280/801.1 |
| 7,112,023 | B1 | 9/2006 | Tardif | |
| 7,302,859 | B2 * | 12/2007 | Mamie | B60P 7/0823 73/831 |
| 7,313,975 | B1 * | 1/2008 | Scorteanu | G01L 5/103 254/257 |
| 7,467,783 | B2 * | 12/2008 | Rawdon | F16G 11/12 254/391 |
| 7,641,177 | B2 * | 1/2010 | Rawdon | F16G 11/146 254/393 |
| 8,833,176 | B1 * | 9/2014 | Shapiro | G01L 5/103 73/828 |
| 8,847,758 | B2 * | 9/2014 | Eide | B60P 7/0861 24/31 R |
| 9,416,847 | B2 * | 8/2016 | Foley | B66C 1/12 |
| 2003/0060997 | A1 * | 3/2003 | Ilyes | B60R 21/01556 702/127 |
| 2003/0150283 | A1 * | 8/2003 | Stanley | G01L 5/103 73/862.391 |
| 2003/0174055 | A1 | 9/2003 | Tardif | |

FOREIGN PATENT DOCUMENTS

| | | |
|---|---|---|
| EP | 1467193 | 10/2004 |
| EP | 1537393 | 6/2005 |
| GB | 2466463 | 6/2010 |
| WO | WO2004025235 | 3/2004 |
| WO | WO2006098681 | 9/2006 |
| WO | WO2009113873 | 9/2009 |

* cited by examiner

DEVICE AND METHOD FOR MEASURING THE TENSION IN A TENSIONING BELT

CROSS-REFERENCE TO RELATED APPLICATIONS

This application is a national phase entry under 35 U.S.C. § 371 of PCT/CH2015/000182 filed on Dec. 11, 2015, which claims priority to Swiss Patent Application No. 01914/14 filed on Dec. 11, 2014, the entirety of each of which is incorporated by this reference.

FIELD OF THE INVENTION

The present invention relates to a device and a method for measuring the tension in a tensioning belt.

PRIOR ART

German Patent DE 197 39 667 relates to a device for detecting the band tension of a belt strap, in particular a lashing strap, having a base housing with guides for the belt strap that are situated transversely with respect to the longitudinal axis of the housing, wherein a guide that is elastically supported by means of at least one spring is provided between two stationary guides, and in the course of measuring the band tension, the belt strap on the spring-elastic guide, which alternately rests with its flat side against the guides, is forced from its stretched state into a deflection in the measuring direction that is proportional to the tension, and having a tension indicator scale, associated with the spring-elastic guide, for indicating the state of tension of the deflected belt strap. The spring-elastic guide is designed as a deflection die which penetrates into the housing, and which with a predefined stroke is transferable from a neutral position to a measuring position. The spring is held between a stop that transmits the stroke, and a base of the deflection die, and in the measuring position is compressible according to the state of tension of the belt strap, with reduction of the distance between the base and the stop, and with increasing depth of penetration of the deflection die into the die housing, the depth of penetration of the deflection die being detectable by means of a tension indicator scale.

An alarm device for indicating the tension of a lashing strap is known from U.S. Patent application US 2003/0174055, the alarm device being integrated into the tensioning belt and triggering an alarm when the belt tension is lost. The device includes a spring that is situated in a housing, and which is compressed by means of a bolt that is connected to the tensioning belt, depending on the tension force that is applied. If no, or insufficient, tension force is applied to the tensioning belt, the spring actuates a contact that triggers an alarm signal. The alarm signal is then relayed by radio to a receiver in the driver's cab. A disadvantage of this arrangement is that only a digital value (yes/no) is transmitted.

A similar device is also known from GB-A-2 466 463, which discloses a tension indicator for tensioning belts. The housing of the indicator may be suspended lengthwise in the tensioning belt via two oppositely situated loop-through openings. A spring, which is oriented perpendicularly to the tensioning belt and which is compressed as a function of the belt tension, is fastened to the housing. The spring opens and closes an electrical contact, thus acting as a switch that indicates whether or not the belt tension is sufficient. The sensor or switch is situated on the side of the spring facing away from the tensioning belt. As a result, likewise only a digital value (0 or 1) can be detected. The different positions of the spring relative to the housing as a function of the belt tension cannot be detected by such a sensor system at one end of the spring.

U.S. Pat. No. 7,112,023 relates to an alarm device for detecting insufficient tensioning belt tension that may be applied to a tensioning belt. The device includes a two-part housing, which on each of two oppositely situated end-face sides has a slot for guiding a tensioning belt in and out. A curved metal spring which deflects the section of the tensioning belt situated between the two slots is located inside the housing. When the tension increases, the metal spring is compressed, which is a measure of the applied tension. The distance between the proximity sensor and the curved spring is measured by means of a proximity sensor situated beneath the metal spring. An electronic signal is triggered if the tension is below a predetermined threshold value. Light-based sensors or motion sensors are suitable as proximity sensors. Also proposed is the use of a magnet, via which a signal is triggered when the spring is detected by the magnetic field.

EP-A-1 467 193 discloses a system for monitoring the fit or tension of a strap belt for securing cargo. The system includes a force sensor, integrated into the strap unit, which measures the force necessary for deflecting the tensioned strap by a predefined distance. The proper fit of a strap is automatically monitored continuously, i.e., also during travel of the vehicle, and the data are transmitted by radio from a transmitter to a display unit. According to EP-A-1 467 193, the values of the detected strap tension, changes in the detected strap tension, and values that fall below a threshold value are displayed. EP-A-1 467 193 proposes to measure the applied force using a strain gauge.

WO 2009/113873 describes a sensor unit for monitoring the state of tensioning belts and the like for securing cargo. The sensor unit includes one or more measuring elements for measuring the tension force, tension, pressure, bending moment, etc. In particular, it is proposed to insert a deformable sleeve, having a circular cross section, which accommodates a bolt that is connected to the tensioning belt. Inductive, optical, magnetic, and other effects are proposed for determining the deformation, but more detailed information is not provided concerning specific sensors to be used and their arrangement.

EP-A-0 984 873 relates to a load indicator for indicating tensions on traction means such as tension belts or lashing cables. These are provided with a loop or eye for engaging with an adaptation part, such as a bolt or a lashing ratchet, that introduces a counter-retaining force to the traction means. The load indicator in EP-A-0 984 873 has the approximate shape of a thimble whose legs rest against the interior flanks of the loop or eye, and which has a display element that is elastically deformable approximately transversely with respect to the inner flanks.

A refinement of the load indicator described above is disclosed by EP-A-1 537 393. For this load indicator, a molded part is situated between a spring and the bolt so that overtensioning, and thus a change in the spring constant, occurs.

The described load indicators have the advantage that they are economically manufacturable, robust, and reliable. On the other hand, it is disadvantageous that in order to read out the applied tension force, one must go to the tensioning belt in question.

ADVANTAGES

The present invention proposes a system and a method for measuring the tension in a tensioning belt that is economically manufacturable and provides reliable values for the tension. A further advantage is to provide added value to a mechanical belt tension indicator.

SUMMARY OF THE INVENTION

These and further advantages are achieved by the subject matter of the present invention. Advantageous embodiments of the subject matter according to the invention are also described.

The invention relates to a device for measuring the tension in a tensioning belt, having an elastically deformable spring element that is deformable as a function of the tension of the tensioning belt. The device also includes an electronic sensor unit having a sensor system that measures the deflection of the spring element, and a transmitter that transmits a data signal to a receiver.

According to the present invention, the sensor system is situated at the ends of the spring element. This arrangement has the advantage that the concept of a mechanical belt tension indicator may be incorporated, and the sensor system may be integrated into the existing design. The development costs may thus be kept low, since the existing indicator is economically manufacturable. The existing mechanical indicator, which has been accepted and in demand in the market for years, acquires value for the customer due to the sensor system, which is cost-effective to manufacture and has a simple design.

The existing mechanical belt tension indicator is may be a U-shaped molded part having two elastically deformable legs. In one particular embodiment, the sensor system is integrated into the legs of the spring element. The distance between the legs depends on the magnitude of the belt tension. The greater the belt tension, the more closely the two legs are pressed together. The sensor system in the legs has the advantage that the sensor system only has to measure the distance between the two legs in order to obtain data for the magnitude of the belt tension.

In another embodiment, the sensor system is integrated into the area of the free ends of the legs. The change in distance relative to the belt tension is greatest at the free ends. Accordingly, accurate measurement can be carried out due to this sensor position, since the change in distance is significant relative to the change in tension. In addition, there is sufficient space at the free ends to integrate the sensor system. Another advantage is that a metal clamp, which brings about the restoring force of the indicator and is present anyway, shields and protects the sensor system from external influences. The sensor system may be integrated into the free leg ends in completely encapsulated form, thus providing sufficient protection also against strong external stresses. It is desirable for the entire sensor unit to be integrated into the legs. There is space in the legs for the entire sensor unit, which in its entirely is well protected from mechanical stresses due to the fact that it may be completely encapsulated in the legs.

In another embodiment, the sensor system is formed by a magnetic measuring system. Magnetic measuring systems are typically insensitive to moisture and soiling. Magnetic sensors are therefore optimally suited for use in transport, which is typically accompanied by harsh use conditions.

In another embodiment, the sensor system is formed either by a magnetic sensor, in particular a Hall sensor, and a permanent magnet, or by an eddy current sensor and a metal plate. These magnetic measuring systems operate reliably and insensitively. The Hall sensor offers the advantage that it delivers signals not only when there are changes in state, but also when the magnetic field in which it is situated is constant. Therefore, the Hall sensor can deliver a measuring signal in real time and continuously measure the belt tension, even when the latter is constant. A magnetoresistor and a field plate or a GMR (giant magnetoresistance) sensor are also conceivable as a magnetic sensor system.

The electronic sensor unit is advantageously integrated into the spring element. As a result of the entire sensor unit together with the microprocessor, sensor system, energy source, and transmitter being integrated into the U-shaped molded part, the spring element or the tension indicator is a one-piece compact component.

It has proven to be advantageous when the transmitter and a transmitter module connected to the transmitter are designed for one-way communication. The transmitter is basically designed for transmitting data within different time intervals, depending on which operating mode is selected. One-way communication is particularly energy-efficient. For example, the Bluetooth 4.0 standard may be used in the transmitter module, which provides significant battery savings as the result of transmitting reduced data sets, and other energy-optimizing settings.

The device advantageously includes additional radio repeaters or radio relays. These devices allow the range of radio communication even under unfavorable environmental conditions, for example for loads containing large amounts of metal or metal sheets, or for very long semi-trailer trucks or loading bridges.

The Hall sensor advantageously acts by applying an external alternating field as a switch between different operating modes. This feature makes it possible to do without physical switches or interfaces for calibrating, setting, or configuring the indicator. Thus, even though it may be completely encapsulated, the sensor unit is operable due to the fact that the access takes place wirelessly.

The Hall sensor may switch the transmitter and/or the transmitter module from one-way communication to a transmitting and receiving mode (two-way communication) by applying an external alternating field. The switching into a configuration mode in which the sensor unit may be calibrated and configured may therefore take place wirelessly.

Another aspect of the invention relates to a method for measuring the tension in a tensioning belt. According to the invention, the tension force is measured by situating the sensor system at the ends of the spring element and measuring the distance between the two ends. A change in the spring tension causes a change in the distance between the two ends of the spring element, this change in distance being detected and measured by the sensor system.

According to the above statements, the tension force may be measured by a Hall sensor and a permanent magnet or by an eddy current sensor, since these measuring methods are insensitive and reliable.

A scaling factor that is appropriate for the spring element in question may be stored in the memory of a microprocessor situated on the spring element. The scaling factor may be stored or modified in the microprocessor by wirelessly switching the microprocessor from a work mode into a configuration mode. The device may be adjusted or calibrated by changing the scaling factor. The scaling factor may be determined by ascertaining, experimentally, for example, a relationship between the tension and the distance between the ends of the spring element.

In one method step, the transmitter and/or the transmitter module are/is switched into a receiving mode by applying an external electrical alternating field to the Hall sensor. The wireless operation of the sensor unit allows a physical interface, a socket, or the like to be dispensed with. The sensor unit may thus have a particularly well-protected design.

In another method step, a plurality of indicators is connected to the receiving unit according to a loading plan stored in the receiving unit, the system assignment taking place via a smart phone. Each individual indicator is thus detected during a cargo transport, and can be located at any time via the loading plan displayed on the smart phone. This is particularly practical when one of the plurality of tensioning belts becomes loose during travel. The loose tensioning belt may be rapidly located with the aid of the loading plan and subsequently retensioned.

The invention further relates to a device for recording the tension in a tensioning belt. The sensor system allows measuring signals to be detected in real time. That is, a measured value is present at any given point in time. The recording of measured values may therefore take place continuously, and is very well suited for simultaneous documentation (data logging) of detection of the tension for a plurality of tensioning belts.

The sensor system is advantageously formed either by a Hall sensor and a permanent magnet, by an eddy current sensor and a metal plate, or by a permanent magnet and a magnetic sensor. These magnetic measuring systems are insensitive to soiling and mechanical stresses, and deliver measuring data even in a constant magnetic field.

Another aspect of the invention relates to a method for recording the tension in a tensioning belt. According to the characterizing part of the independent method claim, the data signals are transmitted at intervals to the receiver unit as data packets, are stored in the receiver unit in real time, and are readable from the receiver unit at any time. Continuous data recording may be implemented in this way. The method is therefore ideally suited for conducting legally required data recordings completely automatically. Laboriously creating manual recordings via visual monitoring may thus be dispensed with.

In one particularly embodiment, the stored or recorded data signals are readable in a computer-readable format, for example in PDF format.

BRIEF DESCRIPTION OF THE DRAWINGS

Exemplary embodiments of the invention are described with reference to the drawings, which show the following.

DETAILED DESCRIPTION OF THE ILLUSTRATED EMBODIMENTS

Figure 1:
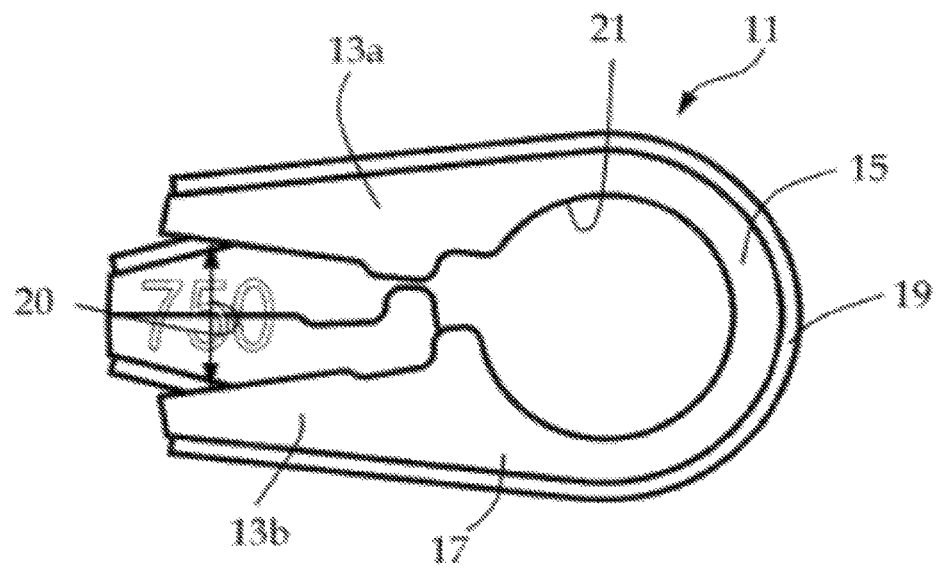
FIG. 1: shows a belt tension indicator according to the prior art.

FIG. 1 shows a mechanical belt tension indicator 11 as known from the prior art. The belt tension indicator 11 is a U-shaped molded part having a first and a second elastically deformable leg 13a, 13b and a base 15. The base 15 of the indicator 11 is essentially curved in a semicircular shape. The indicator 11 includes an insert 17 made of plastic which is enclosed by a metal clamp 19. The insert 17 increases the spring effect of the metal clamp 19, and allows the indicator 11 to undergo continuous stress.

The indicator 11 is situated between a loop of a tensioning belt 2 and a retaining bolt 3 of a tensioning ratchet. The retaining bolt 3 is guided through the molded part at the location where the base 15 forms a bolt eye 21. The tensioning belt 2 is deflected on the outer side of the base 15, and therefore wraps around the indicator 11. The distance 20 between the legs 13a, 13b is influenced by the tension force that acts in the direction of the legs. The greater the tension force, the smaller the distance 20 between the two legs 13a, 13b becomes. The indicator is dimensioned in such a way that the legs 13a, 13b rest against one another at a maximum prescribed tension force. The tension force can be read out only on site, directly at the tensioning ratchet.

The embodiments according to the invention illustrated in FIGS. 2 through 5 show an electronic belt tension indicator 23. The mechanical design of the indicator 23 is basically identical to that of the indicator 11. However, it provides the added value that the tension force no longer has to be read out directly at the tensioning ratchet, but instead is displayable at some other location, such as in the driver's cab of a truck, by an online display. The detected data are not approximate values, as are displayed by the mechanical indicator 11, but, rather, are precise, such as digital, data. The digital data may be detected at any point in time, are recordable, and are wirelessly transmittable. The digital data provide information about the particular magnitude of the tension force on a defined tensioning belt at a defined point in time.

To obtain such digital data, the indicator 23 is equipped with a sensor system in the form of a magnetic distance sensor 25.

Figure 2:
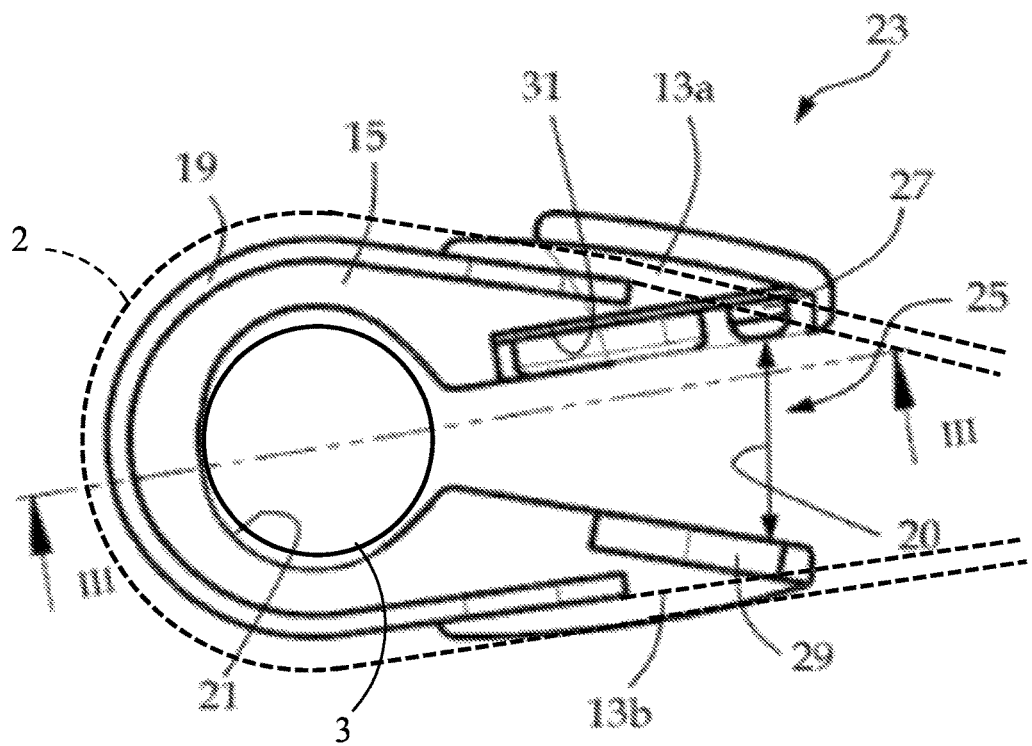
FIG. 2: shows a belt tension indicator with an integrated Hall sensor, in a side view.
Figure 3:
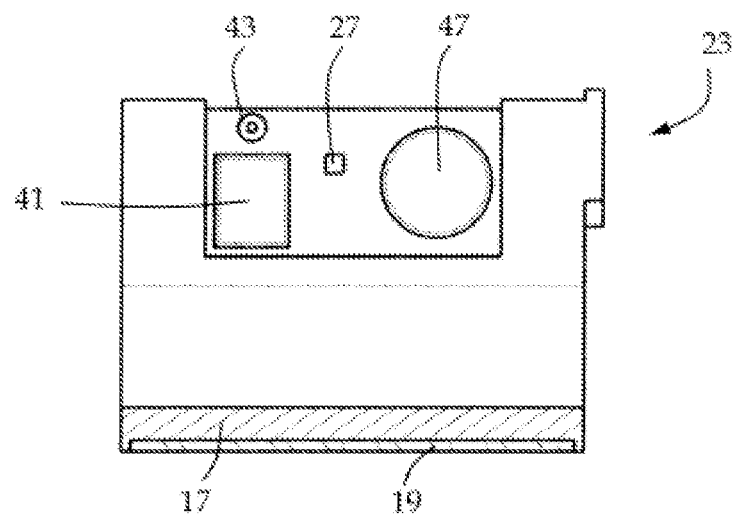
FIG. 3: shows a top view of the indicator from FIG. 2 along the section line III-III.
Figure 4:
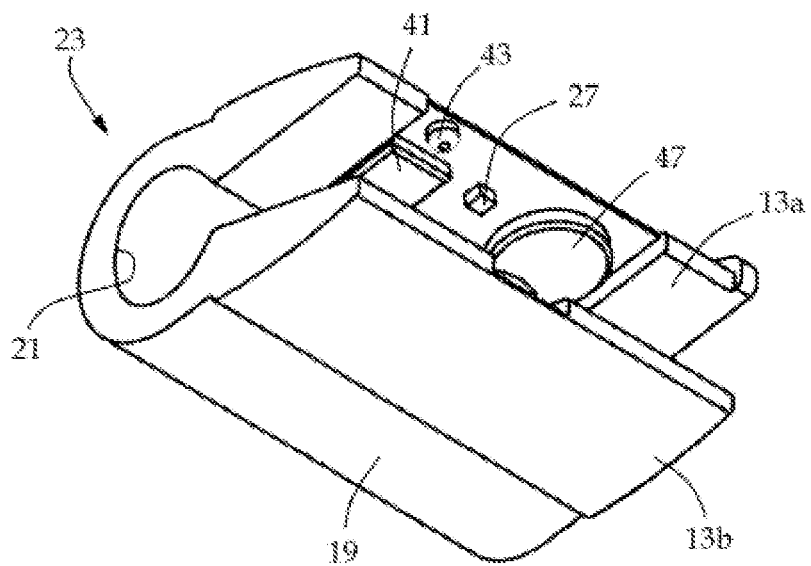
FIG. 4: shows an axonometric view of the indicator from FIG. 2,
FIG. 5: shows a belt tension indicator with an integrated eddy current sensor.

In the embodiment according to FIG. 2, the distance sensor 25 is implemented by a Hall sensor 27 and a permanent magnet 29. The measuring principle of the Hall sensor 27 is based on the fact that it measures the field strength of a magnet. The field strength changes as a function of the distance 20 between the Hall sensor 27 and the permanent magnet 29. The Hall sensor 27 measures the field strength and converts it to a voltage signal. The Hall sensor also generates a voltage signal when the field strength is constant, i.e., when the distance 20 from the permanent magnet 29 does not change. The Hall sensor 27, which is mounted on a circuit board 3231, may be situated at the free end of the first or second leg 13a, 13b. The permanent magnet 29 is situated at the free end of the other leg 13a, 13b. The measuring accuracy of the Hall sensor 27 is not impaired by dirt or water, provided that they are not magnetic. The Hall sensor is therefore particularly well suited for use in a tensioning belt, since tensioning belts often become highly soiled during transport.

The Hall sensor 27 together with the circuit board 31, and the permanent magnet 29 may be integrated into the legs 13a and 13b, respectively. The distance sensor 25 is thus particularly well protected. The electronic components may be completely encapsulated in the legs 13a, 13b, for example by being cast into the plastic of the insert 17. Cavities having an insertion slot may also be provided in the insert 17, in the area of the free ends of the legs 13a, 13b. After the electronic components 27, 29, 31 are inserted into the cavities, the insertion slots may be closed, for example by casting them. The protection of the electronic components 27, 29, 31 is increased due to the fact that the metal clamp 19 encloses the insert 17 on the outside and can act as a protective shield.

Figure 5:
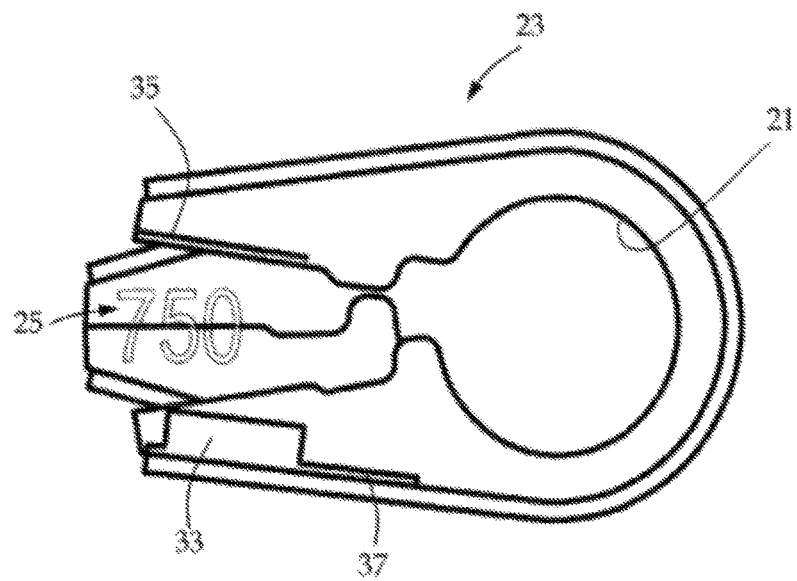

In the embodiment according to FIG. 5, the magnetic distance sensor 25 is implemented by an eddy current sensor 33 and a conductive metal plate 35. The measuring principle of the eddy current sensor 33 is based on the fact that a high-frequency alternating current flows through a coil. When conductive material, for example the metal plate 35, is introduced into the magnetic field of the coil, eddy currents arise which are measurable as increased power consumption by the coil. The closer the metal plate 35 is to the eddy current sensor 33, the greater the power consumption by the coil. The coil may be accommodated with a pot core in a free end of the leg 13a or 13b. The pot core is closed on one side, which prevents the magnetic field from being able to escape unhindered from the side facing the metal plate. In this embodiment as well, the eddy current sensor is connected to a circuit board 37.

Figure 6:
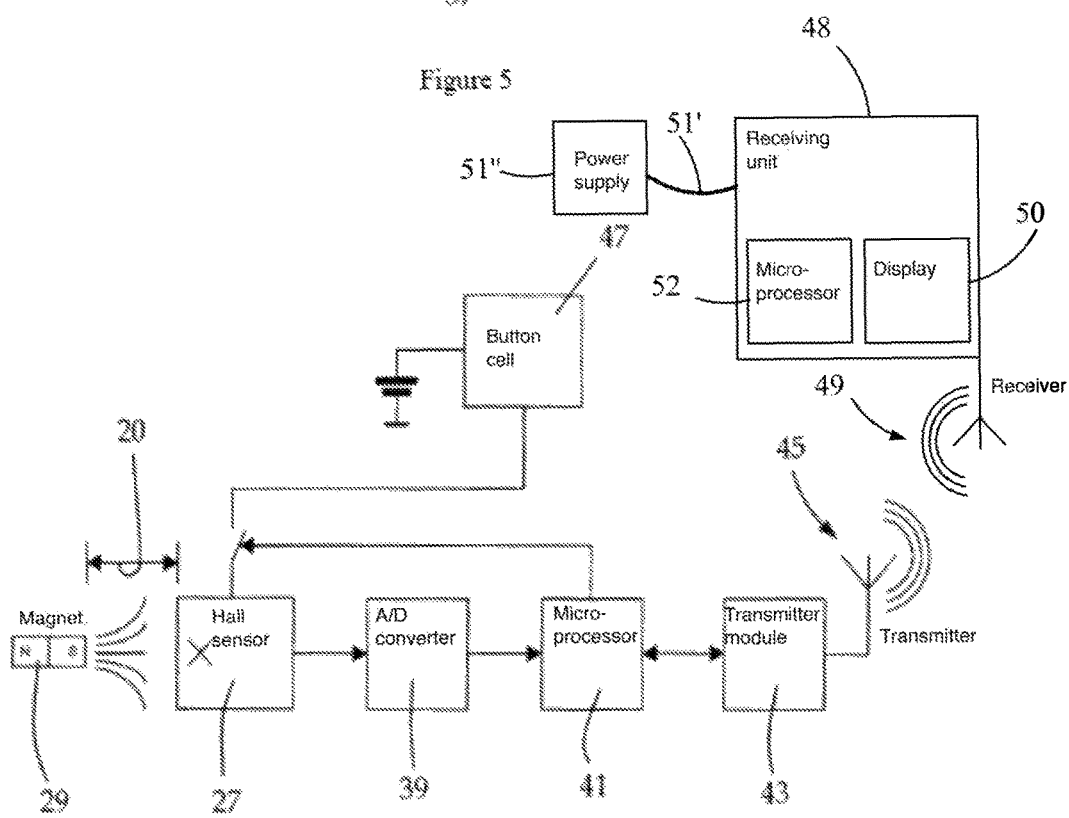
FIG. 6: shows a block diagram of the belt tension indicator from FIG. 2.

An energy source, such as a button cell 47, and a transmitter 45, which are connected to a microprocessor likewise situated on the circuit board 31, 37, are situated on the circuit board 31 or 37. A transmitter module 43 may be connected between the transmitter 45 and the microprocessor 41 (FIG. 6). Although it is conceivable for the transmitter to be able to transmit and also receive data under any wireless standard, a power-saving wireless standard under which data are only transmitted, and only at certain time intervals (one-way-communication), not continuously, is desirable. Bluetooth 4.0, which permits low-energy operating mode, is therefore advisable as a wireless standard.

For configuring and calibrating the electronic belt tension indicator 23, it is provided that the transmitter module 43 or the transmitter 45 is switchable to two-way communication. For this purpose, the Hall sensor 27 is excited by an external electrical alternating field and switches the transmitter module 43 or the transmitter 45 to two-way communication, in which the transmitter 45 is able to also receive data. The data reception, for example for configuration and calibration, takes place via radio. An interface may thus be dispensed with, and the electronic components may be completely encapsulated and thus well integrated into the legs 13a, 13b with good protection.

The electronic belt tension indicator 23 may be in different modes, depending on the distance 20 between the two legs 13a, 13b. If the indicator 23 is not in use and no belt tension is present, the indicator 23 changes to the "deep sleep mode." The indicator 23 is then switched off, and the transmitter does not transmit at all. If belt tension is applied to the indicator 23, the indicator 23 changes to the "active mode," in which the transmitter at certain time intervals transmits data that reflect the distance 20 between the two legs 13a, 13b and a corresponding belt tension. The indicator 23 may also be placed in a "sleep mode" in which the transmission intervals are extended, thus making it possible to save energy. The indicator 23 is placed in this mode when a constant belt tension is detected over an extended period of time. For example, the transmitter then transmits a data signal only every 30-60 seconds. The change between the individual operating modes may also take place by applying an external alternating field as described above. The Hall sensor 27, excited by the external alternating field, hereby functions as a reception communication interface to be able to switch between the different operating modes.

The identification number of the indicator may be assigned by communication of the indicator with the RF tag or the barcode of the tensioning belt. An indicator 23 may be situated at each loop of the tensioning belt. If the tensioning belt becomes jammed on a cargo item and only one side is tensioned, this error is recognized by one of the plurality of indicators 23, since not all indicators indicate a sufficient belt tension.

FIG. 6 shows a block diagram of the indicator 23 with a Hall sensor 27. The analog measuring signal generated by the Hall sensor 27 is a function of the distance 20 from the permanent magnet 29. An analog/digital converter 39 which relays the digital data to a microprocessor 41 is available for the conversion into digital data. The microprocessor 41 relays the data to a transmitter module 43. The transmitter module 43 may be a Bluetooth 4.0 transmitter module as described above. The data may then be transmitted from a transmitter 45 to a receiver.

It is also possible to switch the power supply for the Hall sensor 27 on and off via the microprocessor 41. The microprocessor may thus control whether or not the Hall sensor is active.

The data signals transmitted wirelessly by radio to a receiving unit 48 may be displayed by the receiving unit 48. The receiving unit 48 advantageously includes a receiver 49, a display 50, a connection 51' to an available power supply 51", and a microprocessor 52. For example, the states of tension of a plurality of tensioning belts that secure the cargo may be shown on a display in the driver's cab of a truck. The states of tension may be displayed by a dynamic bar diagram, for example, or in the event of a loss of tension, an alarm in the form of a visual or acoustic signal may be triggered. Further advantageous function blocks of the receiving unit include interfaces for connection to a repeater, which relays the radio signals of the indicator to the receiving unit, and for connection to the tachometer signal of the truck.

In addition to the states of tension of the tensioning belts, the receiving unit may query and display further parameters of the belt tension indicator 23. These include the battery voltage of the indicator 23, minimum and maximum values of the belt tension within a time interval, or the production date of the indicator 23. A GPS receiver and a USB interface may also be present. Continuous traceability of the recordings is ensured by recording the GPS position.

The receiving unit may have two Bluetooth low energy (LE) modules. The receiving unit may be connected to a smart phone in this way. If the smart phone is connected to the receiving unit, the overall device may thus display operations and data on the smart phone. The actual operation of the system thus takes place via a smart phone. The Bluetooth LE module is designed as a master, and communicates with the indicators and repeaters. The second Bluetooth LE module is designed as a slave, and communicates with the smart phone.

The receiving unit may also be used for documenting and recording the tension of a plurality of tensioning belts. For this purpose, the transmitted data signals are permanently recorded in a data memory in the memory of the receiving unit. The states of tension of the detected tensioning belts are therefore detectable in real time. For example, the data of the states of tension may be transferred as PDF files to an external USB stick. It is also conceivable to store the data directly on a USB stick in an unalterable data format. The documented tensions of the tensioning belts used may accordingly be read out on any PC and at any time.

The invention claimed is:

1. A device for measuring a tension in a tensioning belt, comprising:
   a tensioning belt;
   a retaining device;

an elastically deformable spring element comprising a U-shaped molded part having two elastically deformable legs, each leg defining one of two opposite ends the spring element being secured by the retaining device on which a section of the tensioning belt can apply a tensioning force and elastically deform the spring element, the oppositely situated ends of the spring element being movable closer to one another when the tensioning force increases;

an electronic sensor unit comprising:

a sensor system that measures a tension in the spring element and generates a data signal, the sensor system comprising a first component positioned at one of the two opposite ends of the one of the two elastically deformable legs and a second component positioned at the other opposite end of the other of the two elastically deformable legs; a transmitter for transmitting the data signal;

a first microprocessor that is connected to the sensor system and to the transmitter; and an energy source for supplying the electronic sensor unit with power; and an electronic receiving unit for receiving the data signal from the transmitter, comprising:

a receiver;

a display for displaying the data signal; and a second microprocessor connected to the receiver and to the display.

2. The device of claim 1, wherein the sensor system is integrated into the two elastically deformable legs of the spring element.

3. The device of claim 2, wherein the sensor system is integrated into an area of the opposite ends of the two elastically deformable legs.

4. The device of claim 1, wherein the sensor system is formed by a magnetic measuring system.

5. The device of claim 4, wherein the first component of the sensor system comprises a Hall sensor and the second component comprises a permanent magnet.

6. The device of claim 5, wherein the Hall sensor, by applying an external alternating field, is a reception communication interface for switching between different operating modes.

7. The device of claim 6, wherein the Hall sensor is capable of switching at least one of the transmitter or the transmitter module from one-way communication to transmitting and receiving mode for two-way communication by applying an external alternating field.

8. The device of claim 1, wherein the sensor system is formed by an eddy current sensor and a metal plate.

9. The device of claim 1, wherein the electronic sensor unit is integrated into the spring element.

10. The device of claim 1, wherein the transmitter and a transmitter module connected to the transmitter are configured for one-way communication.

11. A method for measuring a tension in a tensioning belt, comprising:

positioning a spring element on the tensioning belt in such a way that the spring element is elastically deformed when tension is applied, the spring element comprising a U-shaped molded part having two elastically deformable legs, each leg defining one of two first and second ends;

positioning a sensor system on or adjacent to the spring element in order to determine a tension in the spring element and generate a data signal, the sensor system comprising a first component positioned at one of the two opposite ends of one of the two elastically deformable legs and a second component positioned at the other opposite end of the other of the two elastically deformable legs;

transmitting the data signal by a transmitter of the sensor system to a receiver unit and displaying the data signals on a display, the sensor system configured to measure a distance between the first and second ends and thereby determine the tension in the tensioning belt.

12. The method of claim 11, wherein the first component comprises a Hall sensor and the second component comprises a permanent magnet.

13. The method of claim 12, wherein at least one of the transmitter or a transmitter module is switched into a receiving mode by applying an external electrical alternating field to the Hall sensor.

14. The method of claim 11, further comprising measuring the tension force with an eddy current sensor.

15. The method of claim 11, further comprising storing a scaling factor that is appropriate for the spring element in a memory of a microprocessor positioned on the spring element.

16. The method of claim 15, wherein the scaling factor is determined by a prior calibration.

* * * * *